May 22, 1962

J. R. SEMELMAN 3,036,267

PERMEABILITY EVALUATOR

Filed Sept. 21, 1959

INVENTOR.
JAY R. SEMELMAN
BY
Lippincott & Ralls
ATTORNEYS

United States Patent Office 3,036,267
Patented May 22, 1962

3,036,267
PERMEABILITY EVALUATOR
Jay R. Semelman, Redwood City, Calif., assignor to Lenkurt Electric Co., Inc., San Carlos, Calif., a corporation of Delaware
Filed Sept. 21, 1959, Ser. No. 841,281
6 Claims. (Cl. 324—34)

The present invention relates to a magnetic core permeability evaluator adapted to produce information upon the permeability of a magnetic core in terms of the number of turns of winding required upon such core to produce a predetermined inductance therefrom and to a programmer for coil winding.

In the manufacture of magnetic cores and in the winding thereof to produce precision coils, it is necessary to very accurately measure the core permeability in order to provide information from which precision winding may be carried out with such cores. Despite advanced manufacturing process, there yet remains an apparent unavoidable variation in permeability of magnetic cores produced under the most carefully controlled conditions. Numerous electronic circuit applications require core-wound coils of precisely known inductance, and the variation in core permeability produces errors well beyond tolerance when presumably identical magnetic cores are wound with like number of turns of electric winding. This problem is well recognized in the art and there have been developed instruments for precisely measuring the permeability of magnetic cores. Conventional instruments of this type, normally denominated as "permeameters," include an indicating dial upon which may be read the permeability of the core under test or the percent of normal turns attributable to this particular core. Such information may then be manually utilized to control coil-winding machines. Various other methods of controlling the inductance of precision-wound magnetic cores include the utilization of a frequency counter for determining the amount of frequency shift caused by the insertion of a core into the permeameter, inasmuch as such shift is somewhat indicative of the variation in winding turns required. It is also possible to employ a bridge circuit to determine the impedance deviation from a standard or nominal core, and to then derive the number of turns to compensate for differences from normal. All of the foregoing approaches to the problems of accurately controlling the number of windings upon individual cores to produce coils of identical inductance will be seen to require manual manipulation in that the information received from the measurements is not in such form as to be directly usable.

The present invention is directed to the provision of core permeability information in a form which is adapted for the control of core acceptance or rejection, or for the control of core-winding operations. The present invention does not relate to a permeameter, inasmuch as instruments of this type are known in the art, and in this respect reference is made to the copending application of John Coffin et al. for Core Testing Device, filed in the U.S. Patent Office with Serial No. 801,874, on March 25, 1959, and assigned to the same assignee as the present application and now Patent No. 2,970,255. A permeameter of the type disclosed in the above-noted patent application operates to encompass test cores with a known number of turns of winding, whereby the inductance of such winding is thereby directly related through the core permeability. The present invention provides for the evaluation, utilization, and conversion to preferred form of the inductance variations available from such a permeameter. In accordance herewith, the permeameter inductance is employed in the resonant circuit of an oscillator. Such oscillator is tuned to resonate at a predetermined frequency when the resonant circuit thereof includes the inductance obtained from a magnetic core of desired permeability. Variations in core permeability from desired or normal values will thus serve to introduce a frequency variation in the output of the oscillator, and in accordance herewith, this frequency-shifted oscillator output is operated upon to establish a count signal equal to the number of turns of winding which should be applied to such core to provide the desired inductance therefrom with the measured permeability. The foregoing operations are herein accomplished with a minimum of equipment and complexity, and in a relatively simple and inexpensive manner, so as to thereby replace former time-consuming and expensive manual manipulations in connection with the precision winding of electrical coils. Further, the results hereof are complete and available in a fraction of a second so that the invention is particularly adapted to high speed and fully automatic operations. It will be readily appreciated that the information produced by the present invention is readily adapted to the direct control of coil-winding devices or may, alternatively, be employed as control means for the acceptance or rejection of cores. Additionally, information produced by the present invention may be employed to identify the inductance per turn of winding, which may at that time or at some later date be wound upon the core. All of the foregoing applications of the present invention and various others not mentioned, serve to materially expedite and simplify the production of precision-wound electrical coils, so as to thereby provide a material advancement in the art.

It is an object of the present invention to provide for visually indicating the number of turns of windings required upon a magnetic core to establish any desired inductance thereof.

It is another object of the present invention to provide means for producing count signals equal to the number of turns of winding required for a core under test to establish a desired inductance of a coil so formed.

It is a further object of the present invention to automatically evaluate magnetic cores for their magnetic qualities, and to provide such evaluation in a form best suited for utilization.

It is yet another object of the present invention to provide an evaluator for automatically indicating the number of turns of winding required upon magnetic cores of various permeabilities to compensate for variations in such permeability in the establishment of a precise inductance of a coil wound upon such core.

It is a still further object of the present invention to provide a programming unit evaluating magnetic cores and dictating the number of turns of electrical winding wound thereon to establish a coil of specified inductance.

Various other possible objects and advantages of the present invention will become apparent to those skilled in the art from the following disclosure of a preferred embodiment of the present invention. No limitation is intended by the terminology of the following disclosure, but instead reference is made to the appended claims for a precise delineation of the true scope of the present invention.

The invention is illustrated in the accompanying drawings, wherein.

Figure 1:
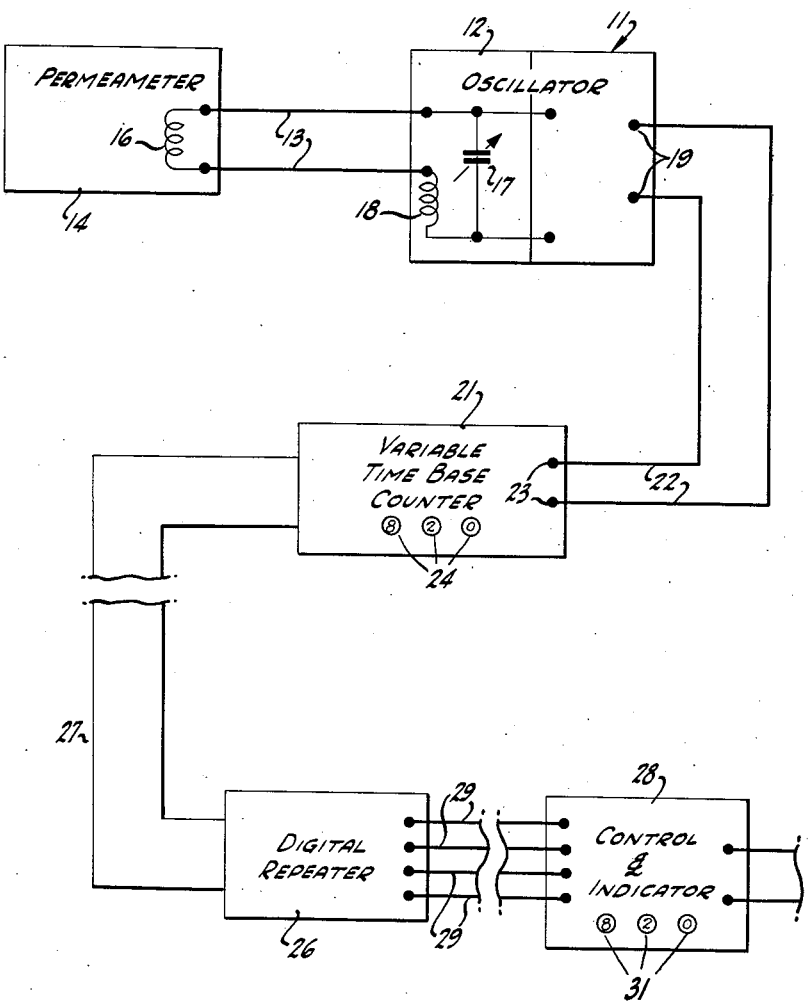
FIG. 1 is a block diagram schematically illustrating an embodiment of the present invention in connection with control means as identified therein, and including both evaluation and control means establishing a coil-winding programmer.

Considering now the present invention as regards the details thereof, and referring to FIG. 1, there will be seen to be provided an oscillator 11 including a tank circuit or resonant circuit 12. Input connections 13 extend from the oscillator to the output of a permeameter 14. The structural details of the permeameter 14 form no part of the present invention, however, connections are made across a test coil 16 of the permeameter to provide input signals for the oscillator hereof. It will be appreciated that conventional permeameters operate to form a winding of one or more turns about test cores placed therein, so that the passage of current through such winding is influenced by the inductance of the coil, as determined by the permeability of the core under test. Any desired conventional oscillator circuitry may be employed herein, and the resonant circuit thereof may assume any conventional configuration, including, for example, a parallel inductance-capacitance circuit. As schematically illustrated in FIG. 1, the tank circuit of the oscillator includes a variable capacitor 17 as well as the permeameter coil 16. In the schematic illustration of FIG. 1, it may be considered that the illustrated coil 16 of the permeameter 14 represents the increase in permeameter inductance by a core disposed through the permeameter coil and that the further illustrated inductance 18 is representative of the inductance of the permeameter without a core therein. The resonant circuit will thus be seen to be comprised of the capacitor 17 and the inductances 16 and 18. It will be appreciated that variations in the inductance of the permeameter coil 16 will thereby serve to vary the resonant frequency of the tank circuit. By the provision of an adjustable capacitor 17, it is possible, in accordance herewith, to tune the oscillator to oscillate at any desired frequency with a predetermined inductance being provided by the permeameter coil 16. In accordance herewith, the resonant or tank circuit 12 is tuned to oscillate at a predetermined frequency with the permeameter coil 16 surrounding a core of desired permeability. It is preferable that the resonant frequency of the oscillator be adjusted to some convenient frequency such as, for example, 10,000 cycles per second, under the above-noted conditions. Variations in the inductance of the coil 16 in the oscillator tank circuit will thus be seen to vary the resonant frequency of the oscillator, so that the frequency of the output signal appearing at output terminals 19 of the oscillator is a function of the permeability of a magnetic core surrounded by the permeameter winding 16.

Connected to the oscillator output 19 is a variable time base counter 21, and input leads 22 extend from the oscillator output terminals 19 to input terminals 23 of the variable time base counter. This unit 21, which may be comprised of a combination of conventional electronic circuits, as noted in more detail below, serves to perform a multiplication function whereby the output of the oscillator 11 is placed in usable form. By the establishment of a variable time base or gating period in the unit 21, it is then possible to count the number of oscillations occurring in the oscillator output for a predetermined period of time. By adjusting the time base counter to establish this counting period as a function of the number of turns desired upon the core being tested to attain a desired inductance thereof, the counting performed by the unit 21 will thus be directly indicative of the number of turns required upon such core. Register means such as indicating lamps, or the like 24, may be provided upon the variable time base counter to provide a visual indication of a number of counts received during the predetermined time interval established by the variable time base counter unit. This visual indication may then be the actual number of turns required upon the core under test to attain the predetermined inductance required therefrom.

In addition to the visual count provided upon the indicators 24 of the unit 21, such count information may be further employed to directly control winding operations so as to thereby achieve full automation of coil-winding operations. Generally, control operations of this type require control signals of substantial power and there is illustrated in FIG. 1 a digital repeater unit 26, connected by means of a cable 27 to the variable time base counter unit 21 for this purpose. While a relatively large variety of amplification means may be utilized in this respect, the digital repeater unit herein envisioned may include a plurality of relay-controlled stepping switches actuated by signals from the counting portion of the variable time base counter unit 21, and connected to suitable power supply means considered to be integral with the illustrated repeater unit 26; all to the end of providing output signals of substantial power corresponding to the count information at the indicator 24. An automatic counting operation may well require the transmission of these control signals a substantial distance, or through rotary connections, and thus it is desirable to minimize the number of conductors required to transmit the information from the repeater unit 26 to a control unit 28 situated at or adjacent coil-winding mechanism. The control signals may be transmitted by radio, carrier frequency techniques, or the simplified pulse system illustrated, including four conductors 29 extending from the output of the repeater unit 26. Of these output conductors 29, one comprises a common lead and the other three conductors carry information regarding the units, tens, and hundreds count signals. Thus, one of the conductors 29 may, for example, transmit a pulse train of five pulses corresponding to a unit count of five. Within the control unit 28 receiving signals from the repeater unit 26, there may be provided suitable conversion circuitry for transforming the count signals from the conductor 29 into such form as may be best employed in the actual control of a coil-winding head. In the instance wherein the control unit 28 is physically separated from the variable time base counter 21, it may be advantageous to provide a register or indicating means 31 upon the control unit 28 to thereby reproduce the count information visually indicated by the indicators 24 of the variable time base counter unit. There may be additionally provided suitable tolerance control at various points of the above-noted circuit. Thus, for example, the digital repeater 26 may include dual stepping switch units having separate portions thereof pre-wired to upper and lower tolerance limits, corresponding to maximum allowable variations in the number of counts received from the variable time base counter. Visual indications may be provided as in the form of a lamp, or the like, upon the digital repeater to indicate the acceptance or rejection of particular turn information received from the variable time base counter, and, furthermore, connections may be made to automatically reject magnetic cores providing a turns reading which does not lie within the tolerance limits.

Whatever the application of the present invention, i.e., whether the turns information at the variable time base counter is employed as above-described to control the precision winding of magnetic coils upon cores of tested permeability, or some other application, the information provided by the variable time base counter in connection with the oscillator unit and permeameter, is provided in such form as to be directly usable. Considering further the operation of the present invention, take as an example an oscillator setting of 10,000 cycles per second as the resonant frequency thereof with a magnetic core of desired permeability disposed in the permeameter, and surrounded by the winding 16 thereof. The capacitor 17 is originally adjusted to tune the resonant or tank circuit 12 of the oscillator to resonance at 10,000 cycles per second with a so-called normal core in the parmeameter. By the original choice of an oscillator output frequency, which is a decade multiple of ten, such as 10,000 cycles per second as herein employed, the multiplication operation hereof is simplified. It will be appreciated that a magnetic core of the same size and different permeability from normal or standard, placed within the permeameter and surrounded by the winding 16 thereof, will cause the oscillator frequency to vary from 10,000 cycles. It is noted that the relationship is an inverse function so that the lower the permeability of a core under test, the higher the frequency output of the oscillator. Considering the example further, it will be assumed that for a core having a nominal permeability there is required some 800 turns of winding thereon to achieve required inductance. In the instance wherein an 800-turn winding is contemplated, the variable time base counter unit 21 is adjusted to establish a time base of 0.0800 second, i.e., turns divided by frequency for normal core. As a consequence of this chosen time base, the oscillator output will be counted in the variable time base counter for a period of 0.0800 second, and it will be seen that with a nominal core disposed in the permeameter and an oscillator output of 10,000 cycles a counting of the oscillations for the above-noted period of time will produce a count indication of 800. This count indication then corresponds to the number of turns required for that particular magnetic core under test. Such number counted appears upon the indicator 24 of the unit 21, so that an operator may visually check the number of turns to be wound upon a particular magnetic core, as determined by the permeability thereof, and in order to achieve a particular desired inductance. If a magnetic core under test in the permeameter has a lower permeability than standard or normal, there will be produced at the oscillator output a signal oscillating at greater than 10,000 cycles. Consider, for example, an oscillator output of 10,250 cycles, and it will be seen that a core producing such an output would require 2.5 percent more turns than normal, to equal the same desired inductance. Th oscillator output signal of 10,250 cycles is applied to the variable time base counter via the connections 22, whereat this signal is counted for a period of .0800 second, to thereby register a count of 820. This is equivalent to the multiplication of the frequency 10,250 times the time base of 0.0800 second. This turn indication is illustrated in FIG. 1 of the drawings at the indicator 24 by the numerals 820 appearing in the circles representing the indicating or registering means of the variable time base counter 21. A wide variety of counting registry means may be utilized as the indicator 24, and thus no detailed explanation thereof is included herein.

It will be seen from the foregoing that the invention hereof operates to produce a count signal and indication corresponding to the number of turns of electrical winding required about a core of any permeability to attain a desired standard inductance of a coil wound from such core. This turn information may, as noted above, be directly employed to identify the particular core under test for future operations thereon. Alternatively, this turns information may be employed to control core-winding operations in the manner generally indicated in FIG. 1, and in this respect if both halves of a coil are to be separately wound, a division by two is incorporated, as in the time base. It is believed to be further apparent from the above discussion that the present invention operates to preclude the necessity of manual calculations and operations formerly necessary in the obtaining of turns information for the winding of magnetic cores. While the actual core testing need not herein deviate from previous well-known methods thereof, the subsequent operation upon signals received from such testing are herein automatically converted to turns indications. One of the greatest advantages of the present invention is the utility of this turns information in the control of core winding directly. Thus, an indication of 820 at the unit 21, still in accordance with the above example, produces an output count of 820 through the cable 27 to such as a digital repeater 26. At this latter station, the count signals are converted into separate pulse trains and transmitted through the conductor 29 to control equipment 28. In the instance wherein the count received at the digital reepater lies without a preset tolerance, suitable indication is made at the repeater and this indication may be further directly employed to automatically reject the core requiring such number of winding turns. In this latter instance, no signals are applied to the output conductors 29, and consequently, the control unit 28 is not energized so that no control signals are applied to such as a winding head for supplying a dictated number of winding turns upon a magnetic core. The present invention is particularly adapted to fully automatic coil winding.

Figure 2:
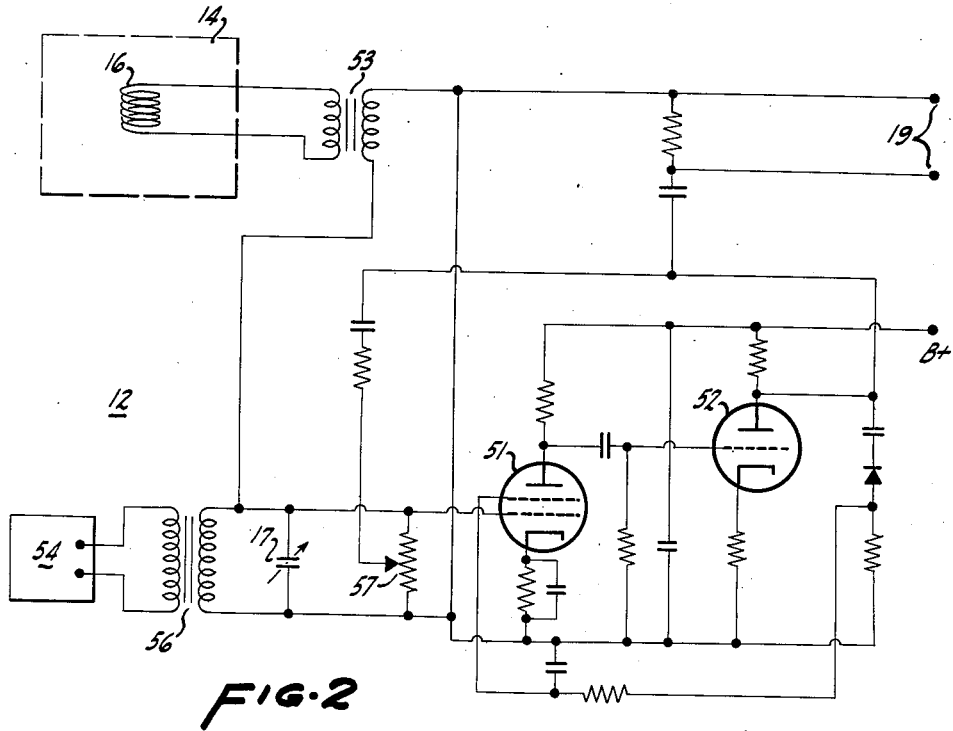
FIG. 2 is a simplified circuit diagram of the oscillator circuit of FIG. 1, and including the electrical circuitry of a permeameter which may be associated therewith.

The individual components of the magnetic core evaluator of the present invention may comprise conventional and well-known units. Thus, for example, the oscillator 11 need not have any particular configuration or circuitry beyond those dictated by good oscillator designs. There is, however, illustrated in FIG. 2 of the drawings, a possible oscillator circuit which may be employed with the present invention to produce the controlled frequency output, and which is adapted for connection to an external winding, so that the output frequency is variable in accordance with the inductance of such winding. As shown in FIG. 2, there may be provided a pair of vacuum tubes 51 and 52 suitably coupled together with conventional feedback means therebetween for conduction in an oscillatory manner, as dictated by the illustrated resonant or tank circuit 12. The permeameter winding 16 is coupled into the remainder of the tank circuit 12 as by means of a transformer 53 serving to amplify the inductance variations in the permeameter winding 16 brought about by the variation in permeability of magnetic cores linked with such winding. Accuracy of the oscillator circuit may be enhanced by the provision of a compensating circuit 54 coupled into the resonant circuit as by means of a transformer 56. Output signals appear between the output terminals 19 and the amplitude thereof may be varied by a rheostat or variable resistor 57. It is to be appreciated that the present invention is not dependent upon the utilization of the illustrated oscillator circuit or any other particular oscillator circuit. There may be employed either the type of resonant circuit illustrated or other resonant circuits such as resistance inductance circuits. It is sufficient that the oscillator produce a fixed frequency output signal for a predetermined inductance in the tank circuit thereof. The variable capacitor 17, illustrated as forming a part of the resonant circuit of the oscillator, serves to provide the necessary adjusting feature for the oscillator, and it will be appreciated that the resonant circuit is, in fact, adjusted for any particular core size and characteristics to be tested. It is not, however, necessary to in any way vary the oscillator parameters during consecutive tests of supposedly like magnetic cores. Thus, with a set oscillator output frequency of 10,000 cycles at a desired permeameter winding inductance, the variations in output frequency are indicative of the variation in permeability of cores under test, and no manual adjustment of the oscillator is required, it being instead desired that the output frequency shall vary as a function of such permeability.

Figure 3:
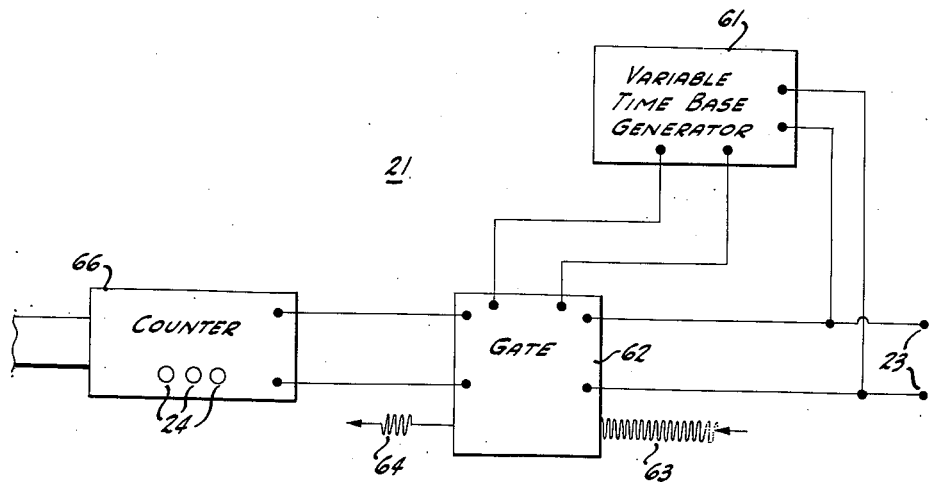
FIG. 3 is a block diagram illustrating the individual components of the variable time base counter of FIG. 1.

As regards the variable time base counter 21, illustrated in FIG. 1 of the drawing, same may be composed of conventional units, as illustrated in FIG. 3, and including a variable time base generator 61 connected to and controlling a gate circuit 62. Input signals to this unit 21 from the output of the oscillator 11 are applied to the gate circuit 62, as indicated by the pulse train 63, in FIG. 3. This gate circuit 62 may be quite conventional and is adapted for control from the illustrated variable time base generator 61. This latter unit 61, which also may be quite conventional, operates to produce gating signals having a variable and precisely controllable period of time separating same. Thus, in the above example of operation of the present invention, the variable time base generator would be adjusted to produce gating signals separated by the time period of 0.0800 second, and an indication of the start of operation of this generator may be obtained from the input terminals 23. With such gating signals applied from the variable time base generator 61 to the gate circuit 62, this latter unit 62 then is open for conducting therethrough for a period of time determined by the time separation of the gating signals received from the variable time base generator. This is indicated by the pulse train 64 to the left of the gate circuit 62 in FIG. 3. The number of pulses arriving at the gate circuit 62 and passing therethrough during the predetermined time interval that the gate is conducting, is applied to a conventional counter 66, having the indicating means 24 upon a face thereof. Thus, the pulse train 64 of a predetermined time duration is applied to the input of the counter 66 and consequently, these pulses are counted and registered upon the indicating means 24 thereof. It will be seen that there is provided by the operations of the variable time base counter 21 a multiplication of the selected time interval and the oscillator output frequency. This multiplication function is herein accomplished in a materially simplified manner from that normally employed in equipment such as computers. While it may be possible to achieve a similar result through the utilization of extensive and complicated computing equipment, the material simplicity of the present invention is submitted as clearly providing a substantial advantage thereover. As indicated above with respect to FIG. 1, the counter 66, illustrated in FIG. 3, provides in addition to a registration of the number of counts received, an output signal of these counts. This output signal from the counter 66 is then avaliable for further utilization either to automatically control the winding of cores having their permeability identified in the permeameter, or to such other end as may be desired.

Innumerable variations are possible in the circuitry of the individual components of the present invention. It has been noted that the oscillator circuit need not follow the illustration thereof, but may, alternatively, comprise any desired oscillator circuitry providing for the inclusion of the inductance of the permeameter winding. Further, the individual circuits of the variable time base counter may be widely varied, inasmuch as each of the circuits thereof are known to have a multitude of equivalents in the art. As regards the programmer of the present invention, the digital repeater 26 illustrated in FIG. 1 of the drawings may be replaced with such as a diode matrix, semiconducting device circuitry, vacuum tube circuitry, or any number of types of digital-to-current devices. Also, the above-noted tolerance feature suggested as being incorporated in the digital repeater may, alternatively, be included in the counter 66 merely by providing for the failure of the current to produce an output signal when the number of counts registered does not fall within a predetermined range. It is also possible to employ impedance bridges in connection with certain portions of the circuitry of the present invention. However, it is believed clear that the particular operations performed by the present invention serve to produce a particular and desirable result by the combination of well-known functions in a particular order, and in a materially simplified manner from anything available in the prior art.

It is particularly noted that the present invention contemplates the provision of turns information rather than mere frequency readings or permeability readings which require further manual manipulation or operations to place same in a usable form. Inasmuch as precision coil winding is a highly developed art wherein untold thousands of individual cores are wound each day, the advancement of the present invention is particularly significant in that the sum total of the advantages hereof is very substantial. The savings in labor and time which may be attained by the utilization of the present invention serve to reduce the cost of precision-wound coils and, furthermore, to improve the quality of such coils. Additionally, the evaluator of the present invention when combined with further units such as illustrated in FIG. 1, comprises a programming unit and turns computer combined which is admirably suited to inclusion in fully automatic coil-winding machines.

What is claimed is:

1. A magnetic core permeability evaluator comprising an oscillator having a resonant circuit including the test winding of a permeameter and producing output signals of a frequency relative to the permeability of a magnetic core linking the turns of said permeameter winding, a gate circuit connected to the output of said oscillator, means controlling said gate circuit to pass oscillator signals for a predetermined variable period of time, and counting means receiving signals from said gate circuit and having a register for indicating received counts as a registration of the number of turns of winding required on a tested core to achieve a predetermined inductance therewith.

2. A magnetic core permeability evaluator comprising an oscillator having a controllable operating frequency and a resonant circuit responsive to the permeability of a magnetic core linking a portion of same whereby the frequency of oscillations is a function of core permeability, and a counter unit counting and registering the number of oscillations of said oscillator for a period of time proportional to the number of turns of winding required on such a core of standard permeability to establish a required inductance.

3. A magnetic core permeability evaluator comprising an oscillator having a resonant circuit with connections for attachment thereto of a test coil adapted to encircle magnet cores of indeterminate permeability whereby the output frequency of said oscillator is a function of such permeability, and means multiplying the output of said oscillator by a predetermined time interval to produce count registrations proportional to the inductance per turn of winding of said cores.

4. A magnetic core permeability evaluator comprising first means producing an oscillatory signal of predetermined controllable frequency, input means controlling said first means in response to permeability variations of magnetic cores being tested to produce related variations in the frequency of said oscillatory signal, means establishing a predetermined controllable time interval proportional to the number of turns of winding required upon a core of desired permeability to produce a winding of specified inductance, and means counting the number of oscillations of said signal for the period of said time interval as a measure of the number of turns of winding required on each individual core to produce said specified inductance.

5. A coil-winding programmer comprising an oscillator having a resonant circuit controlling the oscillation frequency, a permeameter having a winding adapted to encircle test cores and connected to the resonant circuit of said oscillator for varying the frequency of oscillations in inverse relationship to the core permeability, counting means counting the number of oscillations of said oscillator for a predetermined period of time which will produce a count equal to the number of turns of winding required on a core of standard permeability to establish a desired inductance whereby the count is equal to the number of turns of winding on tested cores to produce the same inductance, a repeater unit producing amplified signals from said count and related thereto, and a control unit connected to said repeater for actuation therefrom and providing output control signals for controlling core winding.

6. A coil-winding turn indicator comprising oscillator means producing an oscillatory signal of controllable frequency, a permeameter having a winding adapted to encircle magnet cores for permeability testing thereof, means connecting said permeameter coil to said oscillator means for varying the oscillation frequency as an inverse function of core permeability, gating means connected to the output of said oscillator means and passing oscillatory signals for a controllable time interval equal to the number of turns of electrical winding required on a magnetic core of a standard permeability to produce a desired inductance divided by the frequency of oscillations for a core of such permeability in the permeameter connected to the oscillator means, and counting means registering the number of oscillations passing said gate during said period as the number of turns of winding required on the related core to produce said desired inductance.

References Cited in the file of this patent

UNITED STATES PATENTS

| | | |
|---|---|---|
| 2,576,173 | Cornelius | Nov. 27, 1951 |
| 2,893,651 | Singelman | July 7, 1959 |
| 2,919,853 | Wight et al. | Jan. 5, 1960 |